(12) United States Patent
Rewaskar et al.

(10) Patent No.: US 8,719,402 B2
(45) Date of Patent: May 6, 2014

(54) GOAL STATE COMMUNICATION IN COMPUTER CLUSTERS

(75) Inventors: Sushant P. Rewaskar, Redmond, WA (US); Muhammad Umer Azad, Bellevue, WA (US); Corey M. Sanders, Seattle, WA (US); Saad Syed, Redmond, WA (US); Charles T. Lenzmeier, Woodinville, WA (US); Gaurav Gupta, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 123 days.

(21) Appl. No.: 12/908,891

(22) Filed: Oct. 21, 2010

(65) Prior Publication Data

US 2012/0102186 A1    Apr. 26, 2012

(51) Int. Cl.
*G06F 15/173* (2006.01)

(52) U.S. Cl.
USPC .......................................... 709/224; 714/47.1

(58) Field of Classification Search
USPC ............... 709/246, 224; 719/313, 328; 714/1, 714/47.1; 370/401, 218; 706/54; 710/113
See application file for complete search history.

(56) References Cited

U.S. PATENT DOCUMENTS

| | | | |
|---|---|---|---|
| 6,324,619 B1 | 11/2001 | Raverdy et al. | |
| 7,076,547 B1 | 7/2006 | Black | |
| 7,320,088 B1 | 1/2008 | Gawali | |
| 7,716,274 B1 | 5/2010 | Kumar | |
| 7,839,765 B2 * | 11/2010 | Knight et al. | 370/218 |
| 2001/0025329 A1 * | 9/2001 | Sheikh et al. | 710/113 |
| 2002/0049859 A1 * | 4/2002 | Bruckert et al. | 709/246 |
| 2002/0156888 A1 * | 10/2002 | Lee et al. | 709/224 |
| 2003/0187991 A1 | 10/2003 | Lin et al. | |
| 2005/0005187 A1 * | 1/2005 | Shah | 714/1 |
| 2005/0038772 A1 | 2/2005 | Colrain | |
| 2006/0248193 A1 | 11/2006 | Elvanoglu et al. | |
| 2006/0271395 A1 | 11/2006 | Harris et al. | |
| 2007/0083813 A1 | 4/2007 | Lui et al. | |
| 2007/0162912 A1 | 7/2007 | Kilian | |
| 2008/0008202 A1 * | 1/2008 | Terrell et al. | 370/401 |
| 2010/0106678 A1 * | 4/2010 | Pietrek et al. | 706/54 |
| 2010/0169477 A1 | 7/2010 | Stienhans et al. | |
| 2010/0319004 A1 * | 12/2010 | Hudson et al. | 719/313 |

FOREIGN PATENT DOCUMENTS

CN          101594377          12/2009

OTHER PUBLICATIONS

Joseph, Joshy., "Patterns for High Availability, Scalability, and Computing Power with Windows Azure", Retrieved at << http://msdn.microsoft.com/en-us/magazine/dd727504.aspx >>, May 2009, pp. 10.

(Continued)

*Primary Examiner* — Jungwon Chang
(74) *Attorney, Agent, or Firm* — Ben Tabor; Kate Drakos; Micky Minhas (57) ABSTRACT

Goal state indicators can be communicated from a fabric controller of a computer cluster to each of multiple compute instances in the computer cluster managed by the fabric controller. The goal state indicators can be formatted according to a structured protocol that defines multiple possible goal states. Additionally, status reports can be received from the compute instances. Each of the status reports can indicate a current state of one of the compute instances relative to a goal state previously indicated in a goal state indicator communicated to that one of the compute instances.

20 Claims, 6 Drawing Sheets

(56) References Cited

OTHER PUBLICATIONS

Sun, et al., "Model-driven Automated Error Recovery in Cloud Computing", Retrieved at << http://www.google.co.in/url?sa=t&source=web&cd=4&ved=0CCQQFjAD&url=http%3A%2F%2Fciteseerx.ist.psu.edu%2Fviewdoc%2Fdownload%3Fdoi%3D10.1.1.150.7243%26rep%3Drep1%26type%3Dpdf&rct=j&q=state%20of%20application%20instance%20in%20cloud&ei=hfq3TN-mH9vNjAfn58SrDg& >>, Apr. 2009, pp. 5.

Barr, et al., "Application Architecture for Cloud Computing", Retrieved at << http://www.rpath.com/corp/images/stories/white_papers/WP_ArchitectureForCloudComputing.pdf >>, Sep. 2008, pp. 1-7.

"Windows Azure Platform", Retrieved at << http://www.microsoft.com/windowsazure/windowsazure/ >>, Retrieved Date: Oct. 7, 2010, pp. 3.

"Representational State Transfer", Retrieved at << http://en.wikipedia.org/wiki/Representational_State_Transfer >>, Retrieved Date: Oct. 8, 2010, pp. 8.

"Azure Services Platform", Retrieved at << http://en.wikipedia.org/wiki/Windows_azure >>, Last Modified Date: Oct. 5, 2010, pp. 4.

"International Search Report", Mailed Date: Apr. 24, 2012, Application No. PCT/US2011/053527, Filed Date: Sep. 27, 2011, pp. 11.

Office Action, China Patent Application No: 201110340545.3, Date of Dispatch: Nov. 18, 2013, 10 pages.

\* cited by examiner

GOAL STATE COMMUNICATION IN COMPUTER CLUSTERS

BACKGROUND

Many computing activities are moving toward cloud computing environments such as computer clusters. A computer cluster, as used herein, includes a set of real and/or virtual machines that are commonly managed by a controller entity to perform actions such as storage and computations. The controller entity, which is referred to herein as a fabric controller, is a computing module that allocates resources in the computer cluster. The fabric controller may be hosted on a single machine or spread over multiple machines, and it may be inside and/or outside the computer cluster. The fabric controller of the computer cluster can include a network of interconnected nodes, where each node can be hosted on one or more real and/or virtual machines.

The fabric controller can interact with compute instances, which can perform computations, as requested by the fabric controller, and the requests of the fabric controller can depend on input provided by customers requesting the use of computer cluster resources. A compute instance may be, for example, a real machine, or a virtual machine hosted on a real machine. Within a compute instance, one or more roles may be running. A role is a deployed module, such as an application, that is running within a compute instance to perform computations.

SUMMARY

Whatever the advantages of previous cloud computing tools and techniques, they have neither recognized the computer cluster goal state communication tools and techniques described and claimed herein, nor the advantages produced by such tools and techniques.

In one embodiment, the tools and techniques can include communicating goal state indicators from a fabric controller of a computer cluster to each of multiple compute instances managed by the fabric controller in the computer cluster. The goal state indicators can be formatted according to a structured protocol that defines multiple possible goal states. Additionally, status reports can be received from the compute instances. Each of the status reports can indicate a current state of one of the compute instances relative to a goal state, which was previously indicated in a goal state indicator communicated to that one of the compute instances.

As used herein, goal state for a compute instance refers to a state that the compute instance is expected to reach. For example, the goal state may be a state of the overall compute instance and/or a state of one or more roles within the compute instance. For example, the goal state may include a started or stopped state of the compute instance or of one or more roles role within the compute instance. As another example, a goal state may be a started state with one or more configurations being applied to a compute instance and/or a role in that started state.

As used herein, a status report is a data structure (message, file, etc.) that indicates the status (i.e., the current state and/or health) of a compute instance. A current state of a compute instance, relative to a goal state, is a current state of the compute instance with regard to the parameter(s) specified by the goal state. As just one example, if a goal state is a role being in a started state, examples of current states may include the following for that role: stopped; starting; and started. The health of the compute instance refers to current health attributes of the compute instance other than the current state of the compute instance relative to the goal state.

In another embodiment of the tools and techniques, a goal state indicator can be communicated from a fabric controller of a computer cluster to a compute instance in the computer cluster. The goal state indicator can indicate a goal state for the compute instance. In response to receipt of the goal state indicator at the compute instance, the compute instance can transition toward the goal state. While the compute instance is transitioning toward the goal state, a status report can be communicated from the compute instance to the fabric controller. The status report can indicate a current state of the compute instance relative to the goal state.

In yet another embodiment of the tools and techniques, goal state indicators can be communicated from a fabric controller of a computer cluster to compute instances in the computer clusters. This communication can include delivering the goal state indicators to different compute instances formatted according to different versions of a structured protocol. Status reports can be received from the compute instances at the fabric controller, and each of the status reports can include a current state of one of the compute instances relative to a goal state indicated in a goal state indicator previously communicated to that one of the compute instances.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Embodiments described herein are directed to techniques and tools for improved communication of state information between a computer cluster fabric controller and compute instances in a computer cluster. The goal state communications may provide various benefits, such as allowing compute instances in a computer cluster to have added independence as they drive themselves toward achieving goal states, rather than being actively driven toward goal states by the computer cluster fabric controller. Such improvements may result from the use of various techniques and tools separately or in combination.

Such techniques and tools may include using a protocol such as a structured protocol to present a compute instance with an indication of its goal state, as well as to receive from the compute instance a status report that can indicate the compute instance's current state, and possibly also the compute instance's health. A fabric controller of the computer cluster may support multiple versions of the protocol at one time, so that different compute instances can use different versions of the protocol to communicate with the same fabric controller. For example, this may be useful if one or more compute instances can communicate using older versions of the protocol, but cannot communicate using the most recent version of the protocol that is being used by the fabric controller. The fabric controller can respond to status reports from compute instances by taking appropriate actions if the reports indicate deficiencies in the compute instances that warrant such actions. For example, a role in the instance may be unresponsive, or the instance may be responsive but may not be transitioning toward a goal state that was previously communicated to the instance. The fabric controller may inform a user of problems in a particular compute instance, reboot the instance, migrate a role in the compute instance from one physical machine to a different one, or take other appropriate action depending on the nature of the deficiency. The response may be constrained in a way that does not trust reports of one compute instance to the detriment of other compute instances. For example, the fabric controller may send a communication to shut down a virtual machine compute instance, but it may avoid shutting down a physical machine that is hosting that virtual machine compute instance as well as other virtual machine compute instances. Accordingly, the fabric controller's response may affect the compute instance from which the fabric controller received a status report, but the response may be limited to avoid adversely affecting other compute instances in response to the report.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

Figure 1:
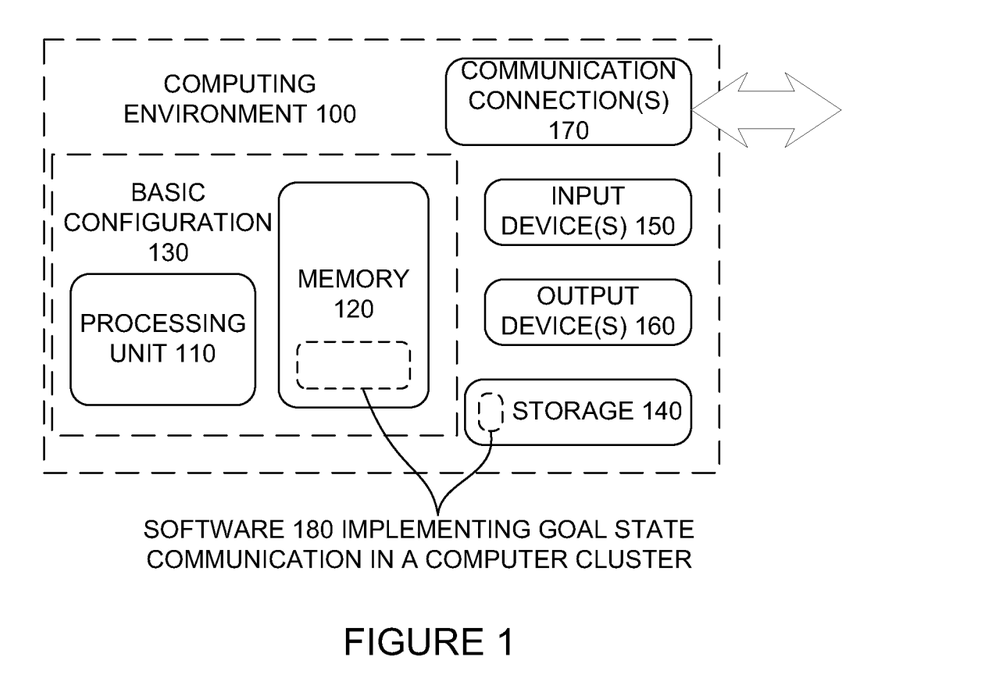
FIG. 1 is a block diagram of a suitable computing environment in which one or more of the described embodiments may be implemented.

FIG. 1 illustrates a generalized example of a suitable computing environment (100) in which one or more of the described embodiments may be implemented. For example, one or more such computing environments can be used as machines in a computer cluster. For example, the environment (100) may be used as a physical machine that is itself a compute instance, or that hosts one or more virtual machine compute instances. As another example, the environment (100) may be used to host at least a portion of a computer cluster fabric controller. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing goal state communication in computing in a computer cluster.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include non-transitory computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available non-transitory storage media that can be accessed within a computing environment. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Computer Cluster System and Environment

Figure 2:
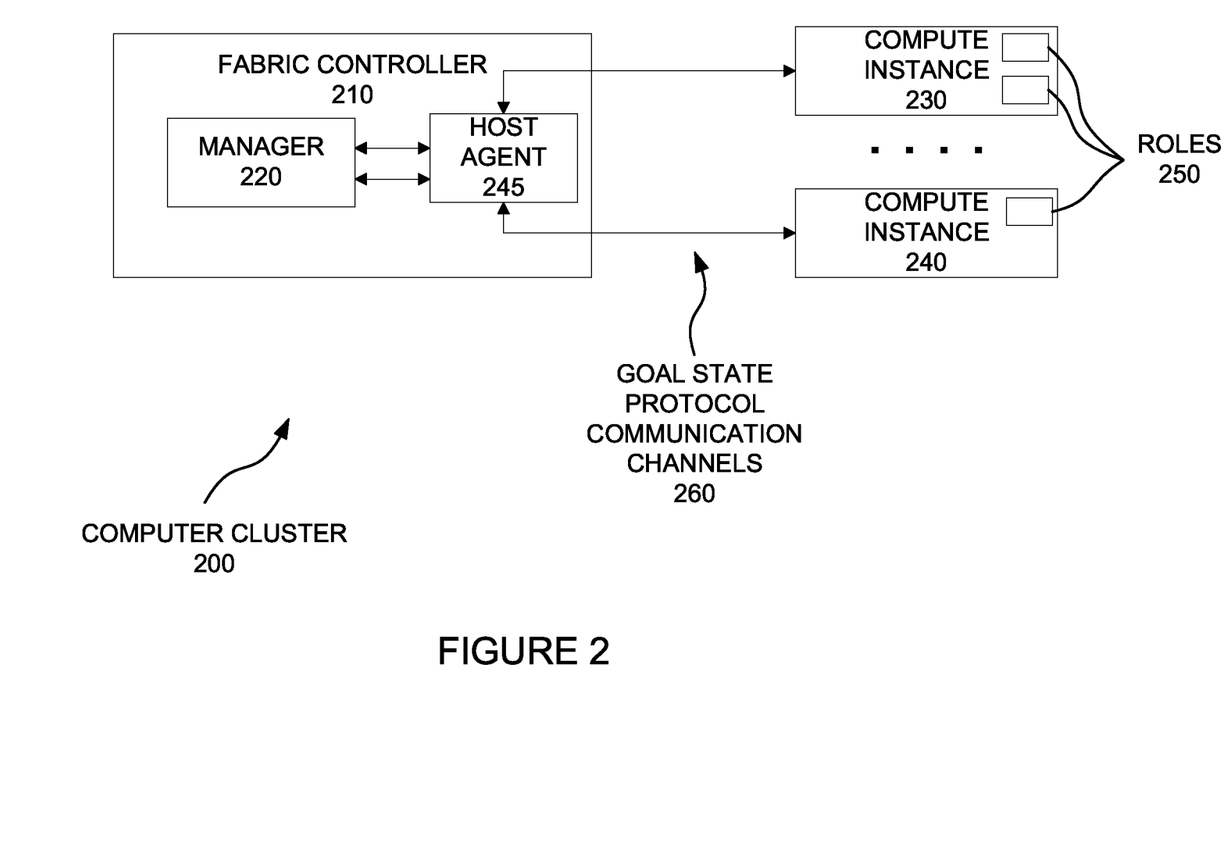
FIG. 2 is a block diagram of a computer cluster.

FIG. 2 is a block diagram of a computer cluster (200) in conjunction with which one or more of the described embodiments may be implemented. The computer cluster (200) can include a fabric controller (210), which can include a manager (220). Alternatively, part or all of the fabric controller (210) may be outside the computer cluster (200). The computer cluster (200) can also include multiple compute instances (230 and 240), which each can be a real or virtual machine. Each compute instance (230 and 240) can send communications to the fabric controller (210) and receive communications from the fabric controller (210). Communications sent to the fabric controller (210) may be analyzed by the manager (220). Likewise, communications can also be sent from the fabric controller (210) to the compute instances (230 and 240). For example, such communications can be sent from the manager (220) to the compute instances (230 and 240).

Communications between the manager (220) and the compute instances (230) may utilize one or more agents to assist in forwarding messages through the computer cluster (200). For example, a proxy or host agent (245) may be present on a physical machine that hosts one or more of the compute instances (230 and/or 240) as virtual machine(s) running on the physical machine, or a host agent for a compute instance may exist elsewhere in the fabric controller (210). The fabric controller (210) may include multiple host agents (245), such as one host agent (245) for each physical machine in the computer cluster (200) that is a compute instance (230 or 240), or that hosts one or more compute instances (230 and/or 240). Additionally, the compute instances (230 and 240) may contain agents that assist in communications. For example, a compute instance (230 or 240) may include a guest agent that communicates with the host agent (245) in the fabric controller (210). Accordingly, the host agent (246) may be hosted on a physical machine and the guest agent may be hosted on a virtual machine being hosted by that physical machine. Alternatively, the host agent (246) and the guest agent may be running in the same physical machine.

Each compute instance (230 and 240) can run one or more roles (250). For example, a role may be a web role customized for web application programming, a worker role for generalized development, or a machine role (e.g., a virtual machine role) that can allow more generalized and independent use of a compute instance (230 and 240) than web roles or worker roles. The roles (250) may also be other types of roles.

The computer cluster (200) may also include additional components and modules, such as storage components. As an example, the computer cluster (200) may be running a Windows® Azure™ cloud services operating system that includes support for computer cluster goal state communications, as described herein.

A service model can be used to describe the composition of a service to be run in the computer cluster (200). This may include a description of the service's constituent applications or roles, and their individual resource requirements. The service model may be a declarative model, so that resources outside the definition are not to be used by the service. The instantiation of a service in the computer cluster (200) can be referred to as a deployment. The service model can also indicate constraints to be satisfied as a service is instantiated into a deployment. For example, a simple service with one front-end may define a service model indicating that the service includes a front-end and what resources the front-end will use. The service model can also indicate the instances of the front-end in the form of roles (250). The resources to be used by the front-end could be, for example, an amount of processing capacity, a size of storage resources, network endpoints, memory size, etc. to be made available to the front end. Additionally, a configuration specified for the front-end could include a background color of a webpage, a title of the webpage, etc. Thus, a service deployment running in the computer cluster (200) may include one or more roles (250) running in one or more of the compute instance (230 and 240). This may include running a service's roles in one instance or in multiple instances.

The manager (220) can be a kernel of the operating system for the computer cluster (200). The manager (220) may use service models, which provide static descriptions as noted above, to allocate resources in the computer cluster (200) between deployments of different services at particular times. The operating system of the computer cluster (200) may also expose a service management API to control the lifecycle of service deployments.

III. Goal State Communication

Different events may trigger changes in the goal state of an instance (230 or 240). These events may include service model updates, platform updates, hardware failures in the compute instances (230 or 240), etc. For example, user input may be provided, where the input indicates an update to the background color of a front-end role by updating the configuration described in the service model. As another example, a user may provide user input indicating that instances (230 and/or 240) running roles (250) for that user are to be stopped. The computer cluster (200) can deliver such goal states to the compute instances (230 and 240), and can monitor the current state and health of the compute instances (230 and 240) as the compute instances (230 and 240) transition toward their goal states (230 and 240).

Each compute instance (230 and 240) can learn the goal state that the compute instance (230 and 240) is to be running in. To do this, each compute instance (230 and 240) can establish a communication channel (260) with the fabric controller (210). This may be done in various ways, such as by publishing a fixed public IP address, for which the computer cluster (200) can set up a route so that communications directed to that public IP address will be redirected to the right entity which can respond with the desired state of the compute instance (230 or 240). For example, communications to the public IP address may be forwarded to the host agent, which can in turn forward communications to the compute instance (230 or 240) (such as to a guest agent within the compute instance (230 or 240)). Communications through the communication channels (260) can be formatted according to a protocol, which can treat each compute instance (230 and 240) as a black box to which goal state indications are sent and from which the current status reports are received.

The protocol can be a structured protocol to facilitate structured communications of goal state and related information across the communication channels (260). Accordingly, the protocol-formatted communications across the communication channels (260) can provide for each compute instance (230 and 240) an interface for communications between the compute instance (230 and 240) and the fabric controller (210). The protocol could be any of various types of protocols. For example, the protocol can be a REST (Representational State Transfer)-based protocol, which can utilize HTTP-formatted messages. The REST-based protocol can use a pull model from the perspective of the compute instances (230 and 240), so that the compute instances can initiate requests to the fabric controller (210). The fabric controller (210) can process the requests and return responses.

Figure 3:
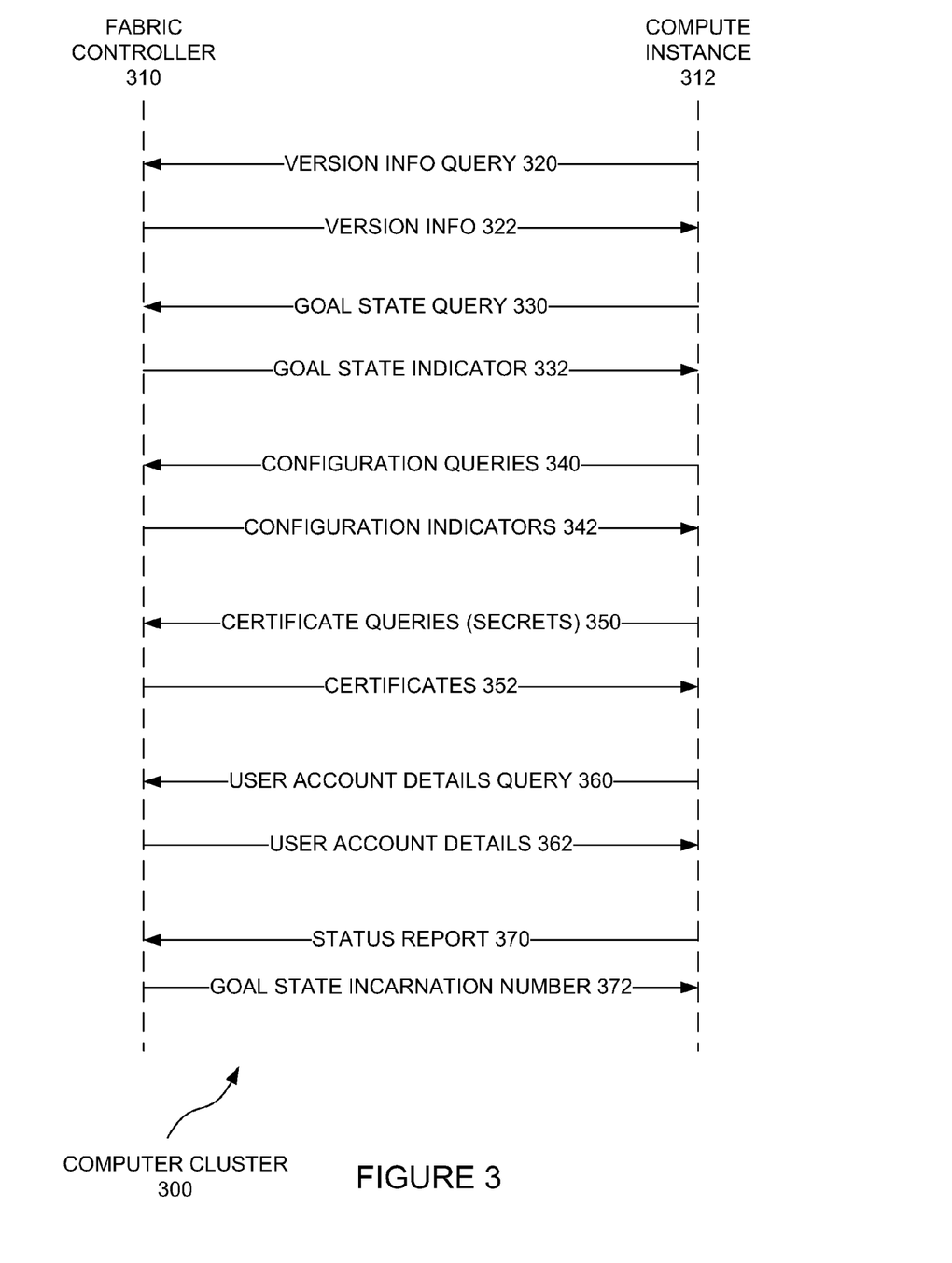
FIG. 3 is a schematic diagram illustrating communications between a fabric controller and compute instance in a computer cluster.

Referring to FIG. 3, some examples of request/response exchanges in a computer cluster (300) between a fabric controller (310) and a compute instance (312) using the REST-based protocol will be discussed. The fabric controller (310) and the compute instance (312) can have an established communication channel as described above (such as by having the fabric controller (310) supply an IP address, which may be the IP address of a host agent for the compute instance (312), using a DHCP option and having the compute instance (312) communicate on that IP address; or having the compute instance (312) publish a public IP address to which messages from the fabric controller (310) can be sent).

The computer cluster (300) may support multiple versions of the protocol at the same time. Accordingly, the compute instance (312) can discover what protocol versions are currently supported, and can choose one of those protocol versions to communicate with the fabric controller (310). The compute instance (312) may send a version information query (320) to the fabric controller (310). For example, the version information query may be an HTTP GET request formatted as follows:

GET http://<hostip>/?comp=versions

In this example, "<hostip>" is a placeholder for a base URI for overall resources specified according to the protocol, and "/?comp=versions" specifies the sub-resource with version information.

In response to the version information query (320), the fabric controller (310) can send version information (322). For example, the version information (322) may be in the form of an XML document with text such as the following:

```
<?xml version="1.0" encoding="utf-8"?>
<Versions>
    <Preferred>
        <Version>2010-03-31</Version>
    </Preferred>
    <Supported>
        <Version>2010-03-31</Version>
        <Version>2009-11-28</Version>
    </Supported>
</Versions>
```

In this example, a "2010-03-31" version is indicated as a preferred version of the protocol, which the compute instance (312) is to use if the compute instance (312) can support that preferred version. The example also indicates that the fabric controller (310) supports a "2009-11-28" version in addition to the "2010-03-31" version. The compute instance (312) can choose a version to use in future communications with the fabric controller (310). If the compute instance (312) supports the preferred version, then the compute instance (312) can choose that preferred version. If the compute instance does not support the preferred version, then the compute instance can use a different version that is listed as a supported version in the version information (322). Different approaches may be taken for the fabric controller (310) to support multiple versions of the protocol. For example, host agents in the fabric controller (310) may be operable to translate communications between different protocol versions to facilitate communication with compute instances (312) in the computer cluster (300) using different protocol versions at the same time. Accordingly, a host agent may translate communications from a fabric controller manager and forward them to the compute instance (312) and vice versa, so that the manager can communicate with the host agent in a most recent version of the protocol, and the host agent may communicate with the compute instance (312) in an earlier version of the protocol if the compute instance (312) does not support the most recent version.

Using the protocol over a communication channel with the fabric controller (310), the compute instance (312) can issue queries to the fabric controller (310), and can receive in return an indication of the goal state of the compute instance (312) from the perspective of the fabric controller (310). That goal state may include one or more of various state parameters indicating a state that is expected of the compute instance. For example, the goal state may include one or more of the following: an expected runtime state of the overall compute instance (312); a list of one or more roles to be running in the compute instance (312) and their expected runtime states from the perspective of the fabric controller (310); configuration information for specific roles; configuration information for the compute instance (312), such as a network configuration for the compute instance (312); and secrets (e.g., certificates and passwords) for the compute instance (312) and its roles (which can be sent in a secured manner, such as by encrypting the certificates and passwords using public and private key techniques).

The compute instance (312) can receive the goal state indicator and work toward achieving the indicated goal state. As the compute instance (312) transitions toward the goal state by performing actions to achieve that state, the compute instance (312) can continue sending status reports to the fabric controller (310). The status reports can indicate the state of the compute instance (312) relative to the goal state, which can include the state of roles running in the compute instance (312). The status report can also indicate health of the overall compute instance (312) and its roles, which can include information in addition to the state of the instance (312) relative to the goal state. The status report can be used by the fabric controller (310) to perform operations in response (like continuing with updates or pausing for things to settle down). Information from the status report can also be exposed to users to present the users with a complete picture of the status of the deployment of their service (which may be running on one compute instance (312) or spread over multiple compute instances).

The protocol can provide a structured way to expose an interface for the compute instance (312) to report its instance-level status (e.g., health of the overall compute instance (312) and information on accounts created on the compute instance) and the status of individual roles within the compute instance (312). As the status of the compute instance (312) changes, the compute instance (312) can continue sending status reports to indicate the changes. As discussed above, the queries, responses, and reports can be provided by the compute instance in one or more of various different structured ways, such as different protocols or different versions of a protocol.

Referring still to FIG. 3, some examples of communications between the compute instance (312) and the fabric controller (310) will be discussed. The compute instance (312) can send a goal state query (330) to the fabric controller (310), which can request the goal state for the compute instance (312). For example, the goal state query (330) can be an HTTP GET request against a URI for the goal state of the compute instance (312). For example, the goal state query (330) may be formatted as follows:

```
GET /machine?comp=goalstate HTTP/1.1
Host: <host-ip>
x-ms-guest-agent-name=DevPlat-Agent-1.0
x-ms-version=2010-03-31
```

In this example, the "Host" field specifies the base URI discussed above, and the text "/machine?comp=goalstate" in the "GET" line specifies the sub-resource with goal state information. Additionally, the "x-ms-guest-agent-name" field specifies the name of an agent within the compute instance (312) that handles communications between the compute instance (312) and the fabric controller (310), and "x-ms-version" specifies the version of the protocol used by the compute instance (312).

In response to the goal state query (330), the fabric controller (310) can send a goal state indicator (332). Following is an example of an HTTP response with such an indicator in XML format:

```
Http/1.1 200 OK
Content-Type: text/xml; charset=utf-8
Content-Length: <length>
ETag: "358972498276402"
<?xml version="1.0" encoding="utf-8"?>
<GoalState
    xmlns:xsi="http://www.w3.org/2001/XMLSchema-instance"
    xsi:noNamespaceSchemaLocation="goalstate.xsd">
    <Version>2010-03-31</Version>
    <Incarnation>12</Incarnation>
    <Machine>
        <ExpectedState>Started</ExpectedState>
    </Machine>
    <Container>
        <ContainerId>C1</ContainerId>
        <RoleInstanceList>
            <RoleInstance>
                <InstanceId>R1</InstanceId>
                <State>Started</State>
                <Configuration>
                    <HostingEnvironmentConfig>http://host-
                    ip/machine/C1/R1?comp=config;type=hostingEnvironmentConfig;
                    incarnation=12</HostingEnvironmentConfig>
                    <SharedConfig>http://host-
                    ip/machine/C1/R1?comp=config;type=sharedConfig;
                    incarnation=12</SharedConfig>
                </Configuration>
            </RoleInstance>
        </RoleInstanceList>
    </Container>
</GoalState>
```

The goal state indicator (332) can indicate a version of the protocol being used ("<Version>2010-03-31</Version>"), and can include an incarnation indicator ("<Incarnation>12</Incarnation>"). The incarnation indicator can be used later by the compute instance (312) to determine whether a newer incarnation of the goal state indicator (332) is available, as will be discussed more below. The goal state indicator (332) can indicate the goal runtime state for the overall compute instance (312), indicated as "<ExpectedState>Started</ExpectedState>", which indicates that the goal state for the overall compute instance (312) is for the compute instance (312) to be started. Similarly, if the goal runtime state of the compute instance (312) were to be stopped, this could be indicated as "<ExpectedState>Stopped</ExpectedState>". The goal state indicator can also include a listing of roles, which can each be specified by a different instance ID (e.g., "<InstanceId>R1</InstanceId>"). Additionally, for each role, the goal state indicator (332) can indicate configuration indications (specified in the "<Configuration> . . . . </Configuration>" section for each listed role) that are available and can be requested by the compute instance.

Using the configuration indications from the goal state indicator (332), the compute instance (312) can send configuration queries (340) to request the configuration indicators (342), which can specify the configurations. The configurations may be specified in various ways. Some or all of the configurations may not be understood by the fabric controller (310) (e.g., the hosting environment configuration information), while other information may be understood by and useable by the fabric controller (e.g., the shared configuration information). Accordingly, at least a portion of the configuration information may be specific to the roles running in the compute instance (312). Other configuration information may be shared by many roles throughout the computer cluster (300). As an example, to receive the hosting environment configuration indicator specified in the example above, the compute instance (312) can send an HTTP GET request for the URI "http://host-ip/machine/C1/R1?comp=config&type=hostingEnvironmentConfig&incarnation=12". The response can include the configuration indicator (342), such as in the form of XML contents specified for that role (R1, as specified in container C1). Similar configuration queries (340) can be sent from the compute instance (312) to the fabric controller (310) for shared configurations for that role, and for other roles if configurations of other roles were indicated in the goal state indicator (332).

Referring still to FIG. 3, the compute instance (312) can also send certificate queries (350), and the fabric controller (310) can respond by sending the certificates (352) in a secure manner, such as using public and private keys. Following is an example of a certificate query (350):

---

Get http://<hostip>/machine/<container>/<role>?comp=certificates&incarnation=12 HTTP/1.1
Host: <host-ip>
x-ms-guest-agent-public-x509-cert=E023CSADE141DACF....
x-ms-version=2010-03-31
The following is an example of a response to such a query:
Http/1.1 200 OK
Content-Type: text/xml; charset=utf-8
Content-Length: <Length>
<?xml version="1.0" encoding="utf-8"?>
<CertificateFile
    xmlns:xsi="http://www.w3.org/2001/XMLSchema-instance"
    xsi:noNamespaceSchemaLocation="certificates.xsd">
    <Incarnation>12</Incarnation>
    <Version>2010-03-31</Version>
    <Format>Pkcs7BlobWithPfxContents</Format>
    <Data>E32BBB0B6A4049EA2CBB550AC7FF84FE9E78E6D0...</Data>
</CertificateFile>

---

Additionally, the compute instance (312) can send a user account details query (360) to request details for a user account in the compute instance (312). The fabric controller (310) can respond with the requested user account details (362). Some or all of the user account details (e.g., passwords) can be sent in a secure manner, such as by using public and private keys.

In addition to sending the queries discussed above, the compute instance (312) can send a status report (370) to the fabric controller (310). The status report (370) can indicate the current state and health of the compute instance and its roles. The compute instance (312) can repeatedly send a current status report (370) to the fabric controller (310) at some periodic interval, such as every 5 seconds or every 15 seconds. This can be done whether the compute instance (312) is transitioning toward its goal state or has already reached its goal state. Accordingly, the fabric controller (310) can continue to monitor the status of the compute instance (312), whether the compute instance (312) is transitioning toward a goal state or already at a goal state, by examining the status report (370) or by noticing that the compute instance has ceased sending status reports for a specified period of time. Following is an example of a status report that indicates the state of two roles (R1 and R2), and that is sent using an HTTP PUT message:

---

PUT /machine?comp=health HTTP/1.1
Host: <host-ip>
Content-Type: text/xml; charset=utf-8
Content-Length: <length>
x-ms-guest-agent-name=DevPlat-Agent-1.0
x-ms-version=2010-03-31
<?xml version="1.0" encoding="utf-8"?>
<Health
    xmlns:xsi="http://www.w3.org/2001/XMLSchema-instance"
    xsi:noNamespaceSchemaLocation="health.xsd">
    <GoalStateIncarnation>12</GoalStateIncarnation>
    <Container>
        <ContainerId>C1</ContainerId>
        <RoleInstanceList>
            <Role>
                <InstanceId>R1</InstanceId>
                <Health>
                    <State>Ready</State>
                </Health>
            </Role>
            <Role>
                <InstanceId>R2</InstanceId>
                <Health>
                    <State>NotReady</State>

-continued

<Details>
    <SubStatus>RoleStartFailed</SubStatus>
    <Description>0x80070005 - Failed to ACL endpoint.</ Description>

```
        </Details>
      </Health>
    </Role>
   </RoleInstanceList>
  </Container>
</Health>
```

As can be seen, the state of role R1 is indicated as ready, while the state of role R2 is indicated as not ready. Details of R2's health are also provided along with its "not ready" state. Specifically, there is a sub-status indication that the role failed to start. Other sub-status indications could include, for example, indications that the role is initializing, busy, stopped, aborted, unresponsive, or unhealthy. For each of these, additional details can be provided as a string in the "Description" field. The compute instance (312) can also indicate its overall compute instance-level state. For example, the compute instance state may be indicated as "started" or "stopped", "healthy" or "unhealthy", etc. The status report (370) could also indicate whether specific configuration changes have been successfully implemented. For example, the status report (370) could indicate whether a particular role had implemented a configuration change that had been requested (e.g., a color change to a background of a front end web application). Such changes can be considered to be transitions to different states, and their details can be reported in the status report (370).

In response to the status report (370), the fabric controller (310) can respond with a current goal state incarnation number (372). The compute instance (312) can compare the received goal state incarnation number (372) with the incarnation number for the goal state indicator (332) that was received most recently by the compute instance (312). If the numbers are different, then the compute instance (312) can send a goal state query (330) to retrieve the most recent goal state indicator (332), as well as other related updated information (new configuration indicators (342), etc.).

The specifics of communicating the goal state indicator (332) from the fabric controller (310) to the compute instance (312) could be different. For example, a different protocol could be used (e.g., a WCF (Windows® Communication Foundation)-based protocol using standard web services bindings, or an HTTP-based protocol where the fabric controller pushes the goal state indicator and other information to the compute instance). As another example, a goal state indicator could also include configuration indicators, certificates, user account details, and/or other information within a single message. As yet another alternative, the information in the goal state indicator could be broken into smaller segments and sent in even more messages. Additionally, the request/response exchanges in a computer cluster (300) could be reordered from what is depicted in FIG. 3 and described above. For example, the queries could be reordered. Moreover, one or more status reports like the status report (370) could be sent before information was received by the compute instance (312) in response to some or all of the queries (330, 340, 350, and/or 360), and also before some or all of the queries (330, 340, 350, and/or 360) were sent.

IV. Techniques for Goal State Communication in Computer Clusters

Several computer cluster goal state communication techniques will now be discussed. Each of these techniques can be performed in a computing environment, such as the environments of FIGS. 1-3. For example, each technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 4:
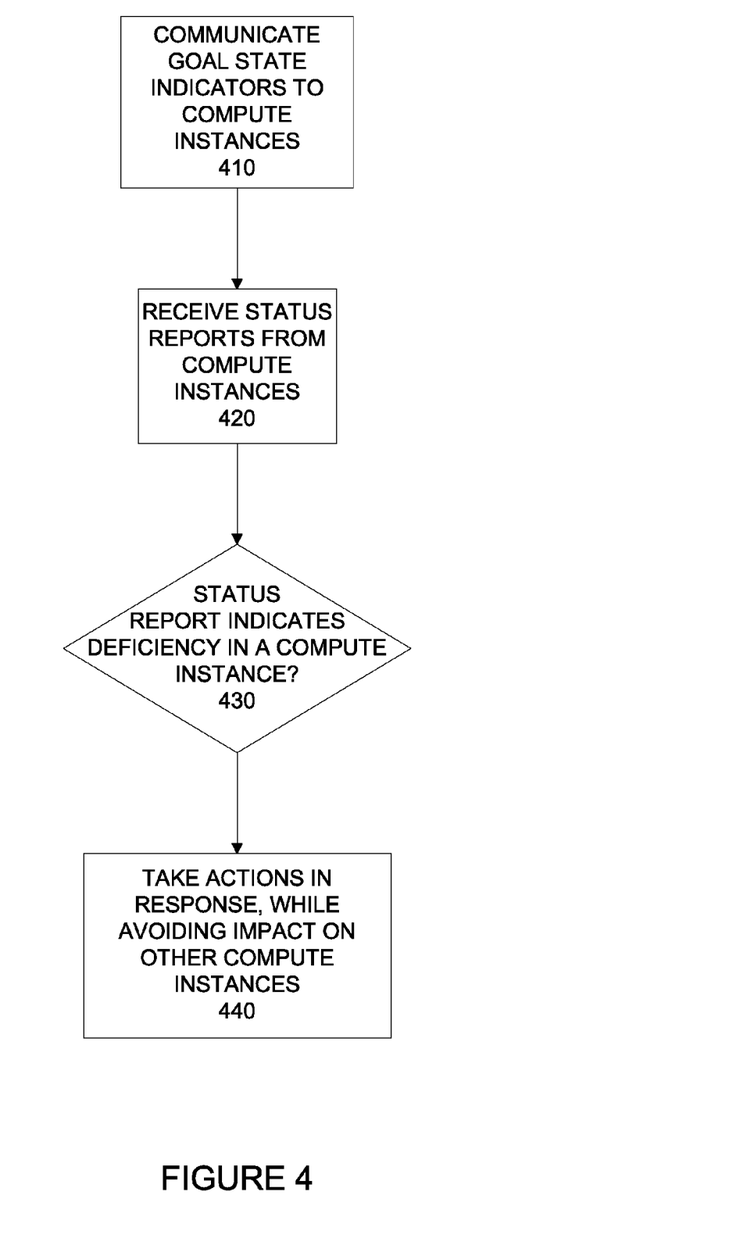
FIG. 4 is a flowchart of a computer cluster goal state communication technique.

Referring to FIG. 4, a computer cluster goal state communication technique will be described. In the technique, goal state indicators can be communicated (410) from a fabric controller of a computer cluster to each of multiple compute instances managed by the fabric controller in the computer cluster. For example, the communication (410) of the goal state indicators can be done in response to requests from the compute instances. The goal state indicators can be formatted according to a structured protocol that defines multiple possible goal states. Additionally, status reports can be received (420) from the compute instances. Each of the status reports can indicate a current state of one of the compute instances relative to a goal state previously indicated in a goal state indicator communicated to that one of the compute instances. The status reports can be formatted according to the structured protocol.

The computer cluster can be operable to deliver goal state indicators to different compute instances in the computer cluster, with the goal state indicators formatted according to different versions of the structured protocol.

The technique of FIG. 4 can further include determining (430) whether a status report indicates a deficiency in a first compute instance in the environment that warrants a response. If so, then one or more actions can be taken (440) in response to the indicated deficiency. The one or more actions can be limited to avoid adversely impacting one or more compute instances in the computer cluster other than the first compute instance. The first compute instance can include at least a portion of a deployment of a first service, and the one or more compute instances other than the first compute instances can include at least a portion of one or more deployments of one or more services other than the first service.

Figure 5:
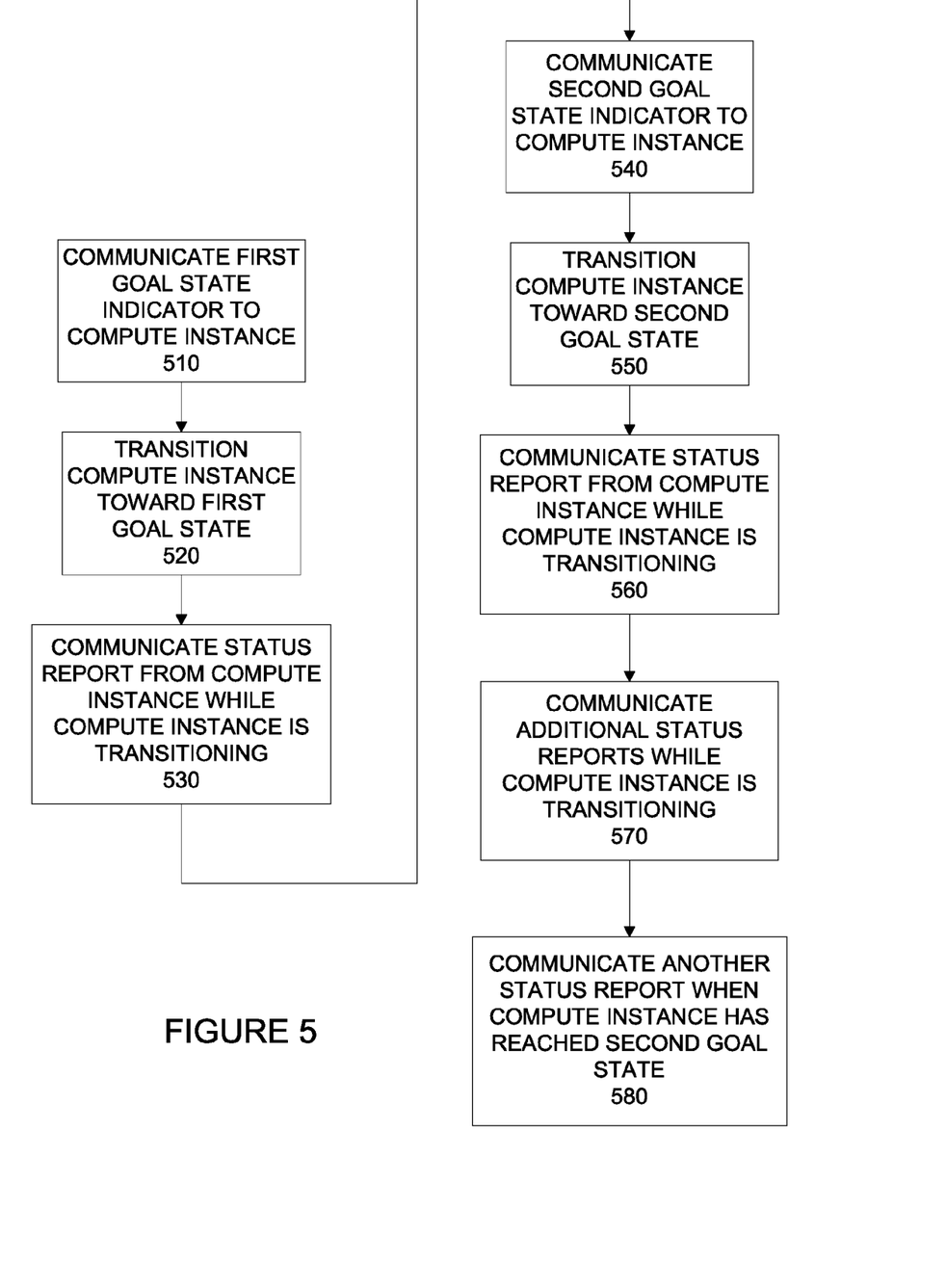
FIG. 5 is a flowchart of another computer cluster goal state communication technique.

Referring now to FIG. 5, another computer cluster goal state communication technique will be described. The technique can include communicating (510) a first goal state indicator from a fabric controller of a computer cluster to a compute instance in the computer cluster. For example, the compute instance can be a virtual machine. The first goal state indicator can indicate a first goal state for the compute instance. In response to receipt of the first goal state indicator at the compute instance, the compute instance can transition (520) toward the first goal state. The compute instance can transition (520) toward the first goal state without being driven toward the first goal state by external modules, such as the fabric controller or components within the fabric controller. While the compute instance transitions (520) toward the first goal state, a first status report can be communicated from the compute instance to the fabric controller.

Additionally, a second goal state indicator can be communicated (540) from the fabric controller to the compute instance. The second goal state indicator can supersede the first goal state indicator and can indicate a second goal state for the compute instance. The second goal state indicator may be communicated (540) before the compute instance reaches the first goal state. In response to receipt of the second goal state indicator at the compute instance, the compute instance can transition (550) toward the second goal state. While the compute instance is transitioning toward the second goal state, a second status report can be communicated (560) from the compute instance to the fabric controller. The second status report can indicate a current state of the compute instance relative to the second goal state, and can also indicate a current health of the compute instance.

One or both of the goal state indicators can be communicated (530 and/or 560) in response to a request from the compute instance. Additionally, one or both of the status reports can be communicated without the compute instance receiving a request for that status report from the fabric controller. Also, the computer cluster can be operable to generate and deliver goal state indicators to different compute instances formatted according to different versions of a structured protocol. The goal state indicators and the status reports can be formatted according to a structured protocol, such as a structured REST-based protocol. The first and/or second goal states can be selected from a group consisting of starting a specified role in the compute instance, stopping a specified role in the compute instance, and combinations thereof.

While the compute instance is transitioning (550) toward the second goal state (and possibly also while the compute instance is transitioning (520) toward the first goal state), additional status reports can be communicated (570) from the compute instance to the fabric controller. The additional status reports can each indicate a current state of the compute instance relative to the goal state. Moreover, another status report can be communicated (580) from the compute instance to the fabric controller when the compute instance has reached the goal state. The other status report can indicate a current state of the compute instance as having reached the goal state.

The technique of FIG. 5 may also include determining whether one or more of the status reports indicates a deficiency that warrants a response. For example, determining whether a deficiency warrants a response may be done by consulting rules that dictate what types of deficiencies warrant responses, how long to allow a deficiency to exist before it warrants a response, and what responses are to be taken for specified types of deficiencies. Additionally, one or more responses can be taken by the fabric controller in response to the indicated deficiency. For example, the one or more actions can include moving an instance of a role in the compute instance from a first physical machine to a second physical machine. Such response may be limited to responses that do not adversely affect other compute instances in the computer cluster.

Figure 6:
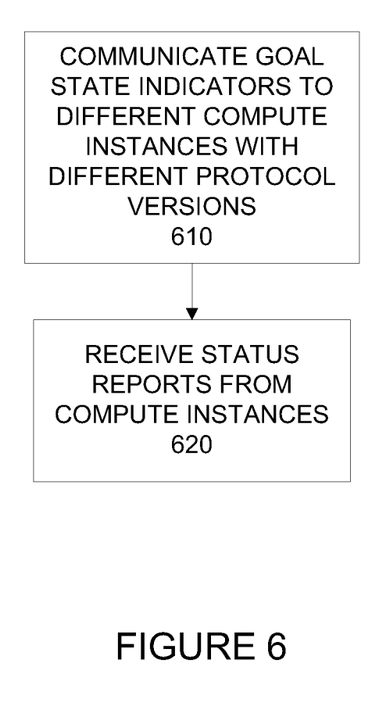
FIG. 6 is a flowchart of yet another computer cluster goal state communication technique.

Referring now to FIG. 6, yet another computer cluster goal state communication technique will be described. The technique can include communicating (610) goal state indicators from a fabric controller of a computer cluster to compute instances in the computer cluster. Communicating (610) the indicators can include delivering the goal state indicators to different compute instances formatted according to different versions of a structured protocol. Additionally, status reports can be received (620) from the compute instances by the fabric controller. Each of the status reports can include a current state of one of the compute instances relative to a goal state indicated in a goal state indicator previously communicated to that one of the compute instances. Each of the status reports can be received (620) from a corresponding compute instance, and each can be formatted according to a version of the protocol used to communicate a goal state indicator to that corresponding compute instance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. One or more computer-readable storage media having computer-executable instructions embodied thereon that, when executed by at least one processor, cause the at least one processor to perform acts comprising:
   communicating goal state indicators from a fabric controller of a computer cluster to each of multiple compute instances in the computer cluster, the compute instances being managed by the fabric controller, the goal state indicators being formatted according to a structured protocol that defines multiple possible goal states; and
   receiving status reports from the compute instances, the status reports being formatted according to the structured protocol, one or more of the status reports each indicating a current state of one of the compute instances relative to a goal state, which was previously indicated in a goal state indicator communicated to the one of the compute instances, and one or more of the status reports indicating a current health of the one of the compute instances, the current health being different from the current state relative to the goal state.

2. The one or more computer-readable storage media of claim 1, wherein communicating the goal state indicators is done in response to requests from the compute instances.

3. The one or more computer-readable storage media of claim 1, wherein the status reports are formatted according to the structured protocol.

4. The one or more computer-readable storage media of claim 1, wherein the computer cluster is operable to deliver goal state indicators to different compute instances in the computer cluster, wherein the goal state indicators are formatted according to different versions of the structured protocol, and wherein the computer cluster supports the different versions of the structured protocol at the same time.

5. The one or more computer-readable storage media of claim 1, wherein the acts further comprise:
   determining whether one of the status reports indicates a deficiency in a first compute instance in the computer cluster that warrants a response; and
   if one of the status reports does indicate a deficiency that warrants a response, then taking one or more actions in response to the deficiency, the one or more actions being limited to avoid adversely impacting one or more compute instances in the computer cluster other than the first compute instance.

6. The one or more computer-readable storage media of claim 5, wherein the first compute instance includes at least a portion of a deployment of a first service, and the one or more compute instances other than the first compute instances include at least a portion of one or more deployments of one or more services other than the first service.

7. A computer-implemented method, comprising:
   a compute instance in a computer cluster receiving a goal state indicator from a fabric controller of the computer cluster, the goal state indicator indicating a goal state for the compute instance, the goal state for the compute instance being different from a state of the compute instance when the compute instance receives the goal state indicator from the fabric controller;
   in response to receipt of the goal state indicator at the compute instance, transitioning the compute instance toward the goal state; and while the compute instance is transitioning toward the goal state, communicating a status report from the compute instance to the fabric controller, the status report indicating a current state of the compute instance relative to the goal state.

8. The method of claim 7, wherein the goal state indicator is received in a response to a request from the compute instance, and wherein the status report is communicated without the compute instance receiving a request for the status report from the fabric controller.

9. The method of claim 7, wherein the status report further indicates a current health of the compute instance.

10. The method of claim 7, wherein the computer cluster is operable to generate and deliver goal state indicators to different compute instances formatted according to different versions of a structured protocol, and wherein the computer cluster supports the different versions of the structured protocol at the same time.

11. The method of claim 7, wherein the goal state indicator and the status report are formatted according to a structured protocol.

12. The method of claim 7, wherein the goal state is selected from a group consisting of starting a specified role in the compute instance, stopping a specified role in the compute instance, and combinations thereof.

13. The method of claim 7, further comprising, while the compute instance is transitioning toward the goal state, communicating additional status reports from the compute instance to the fabric controller, the additional status reports each indicating a current state of the compute instance relative to the goal state.

14. The method of claim 7, wherein the status report is a first status report, and wherein the method further comprises, when the compute instance has reached the goal state, communicating from the compute instance to the fabric controller an additional status report that indicates a current state of the compute instance as having reached the goal state.

15. The method of claim 7, wherein the goal state is a first goal state, wherein the goal state indicator is a first goal state indicator, wherein the status report is a first status report, and wherein the method further comprises:
the compute instance receiving a second goal state indicator from the fabric controller, the second goal state indicator superseding the first goal state indicator and indicating a second goal state for the compute instance;
in response to receipt of the second goal state indicator at the compute instance, transitioning the compute instance toward the second goal state indicated in the second goal state indicator; and
while the compute instance is transitioning toward the second goal state, communicating a second status report from the compute instance to the fabric controller, the second status report indicating a current state of the compute instance relative to the second goal state.

16. The method of claim 15, wherein:
the compute instance is a virtual machine;
the first goal state indicator, the second goal state indicator, the first status report, and the second status report are formatted according to a structured REST-based protocol;
the first status report further indicates a current health of the compute instance;
the computer cluster is operable to deliver goal state indicators formatted according to different versions of a structured protocol, and the computer cluster supports the different versions of the structured protocol at the same time;
the goal state is selected from a group consisting of starting a specified role in the compute instance, stopping a specified role in the compute instance, and combinations thereof;
the method further comprises, while the compute instance is transitioning toward the second goal state, communicating additional status reports from the compute instance to the fabric controller, the additional status reports each indicating a current state of the compute instance relative to the second goal state; and
the method further comprises, when the compute instance has reached the second goal state, communicating from the compute instance to the fabric controller another status report that indicates a current state of the compute instance as having reached the goal state.

17. The method of claim 15, wherein communicating the second goal state indicator is done before the compute instance reaches the first goal state.

18. The method of claim 7, further comprising:
determining whether the status report indicates a deficiency that warrants a response; and
if the status report does indicate a deficiency that warrants a response, then taking one or more actions by the fabric controller in response to the deficiency, the one or more actions comprising moving an instance of a role in the compute instance from a first physical machine to a second physical machine.

19. One or more computer-readable storage media having computer-executable instructions embodied thereon that, when executed by at least one processor, cause the at least one processor to perform acts comprising:
communicating goal state indicators from a fabric controller of a computer cluster to compute instances in the computer cluster, the communicating of the goal state indicators including sending a goal state indicator to a compute instance of the compute instances; and
receiving current state indicators from the compute instances, the receiving of the current state indicators including receiving an indicator of a current state of the one of the compute instances relative to a goal state indicated in the goal state indicator previously communicated to the one of the compute instances, the current state indicators being formatted according to a structured protocol; and
receiving health indicators from the compute instances, the receiving of the health indicators including receiving an indicator of health of the one of the compute instances, the health indicators being different from the current state indicators, and the health indicators being formatted according to the structured protocol.

20. The one or more computer-readable storage media of claim 19, wherein each of the health indicators and each of the current state indicators is received from a corresponding compute instance, and wherein the protocol is used to communicate a goal state indicator to that corresponding compute instance.

* * * * *